United States Patent Office 3,554,869
Patented Jan. 12, 1971

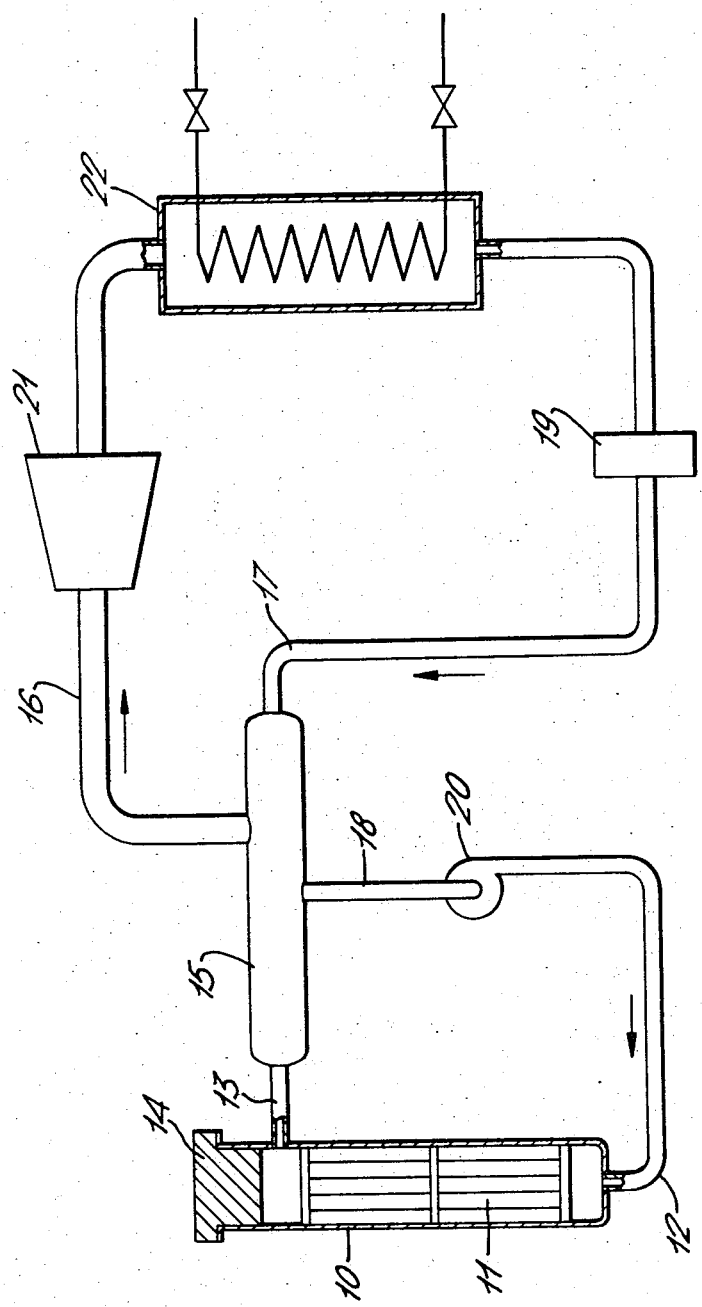

3,554,869
NUCLEAR REACTOR SYSTEMS OF THE DIRECT CYCLE BOILING WATER TYPE
George Kenneth Dickson, Stretton, England, assignor to United Kingdom Atomic Energy Authority, London, England
Filed Oct. 27, 1967, Ser. No. 678,717
Claims priority, application Great Britain, Nov. 9, 1966, 50,336/66
Int. Cl. G21c 15/00, 9/00
U.S. Cl. 176—55
1 Claim

ABSTRACT OF THE DISCLOSURE

A nuclear reactor of the direct cycle boiling water type has steam generation, utilisation, condensation and return to the reactor all at superatmospheric pressure and in an atmosphere which is chemically reducing. The chemically reducing atmosphere may be created by an initial supply of ammonia or hydrogen or may be allowed to build up from radiolysis products retained in the system. The heat removed at steam condensation can be used in a low temperature turbine or engine system.

BACKGROUND OF THE INVENTION

This invention relates to nuclear reactor systems of the direct cycle boiling water type (B.W.R.). Known reactors of this type include the Oyster Creek reactor and the S.G.H.W. reactor at Winfrith Heath, England. A feature of these reactors is that steam generated in the core of the reactor passes directly to a steam utilisation plant, such as a turbine, without the intervention of a heat exchanger and is returned to the reactor after condensation at sub-atmospheric pressures.

SUMMARY OF THE INVENTION

The invention provides that in a direct cycle B.W.R. system the steam generation, utilisation, condensation and return to the reactor occurs wholly at pressures above atmospheric, and in an atmosphere which is chemically reducing.

DESCRIPTION OF THE PREFERRED EMBODIMENTS

A reactor system according to the present invention will now be described with reference to the accompanying drawing which is a flow diagram.

An S.G.H.W. nuclear reactor is represented by one of its pressure tubes 10 containing nuclear fuel 11. The tube 10 has a water inlet pipe 12, a steam/water outlet pipe 13 and a closure plug 14. The pipe 13 connects with a steam drum 15 having a steam outlet pipe 16, a feed water pipe 17 and recirculating water pipe 18. A feed water pump 19 and recirculation pump 20 are provided. The steam from the drum 15 passes to a turbine 21 and then to a heat exchanger 22, which can withdraw heat such that all the steam discharged from the turbine 21 is condensed and is then passed back to the steam drum by feed pump 19.

The S.G.H.W. reactor typically operates at 925 p.s.i. and provides a water/steam mixture at outlet pipe 13 in which 7.3% of the water has been evaporated to steam. Steam generation takes place in an atmosphere derived from an initial water supply provided with 10 p.p.m. ammonia.

The invention, of course, is not limited to the specific arrangement described above. Reasonable ranges of modification are as follows:

Operating pressure—500–1000 p.s.i.
Steam content—5–25%
Ammonia content—Zero or in the range 2.5–10 p.p.m.

(In the range greater than zero and less than 2.4 p.p.m. of ammonia there is a risk as shown by experimental tests in rigs of the creation of corrosive oxides of nitrogen although it is possible, but yet unproven, that even this range p.p.m. may be acceptable.)

Thus it is seen that the reducing atmosphere is generated by the return of the initial is to be compared with the known art where non-condensable gaseous products of radiolysis are vented from the sub-atmospheric conditions sustained in the condenser. Thus, in the invention, oxygen and oxides of nitrogen are not present to any significant extent and a non-corrosive and reducing atmosphere is maintained.

Tests in rigs have shown that for zero ammonia content in the water initially supplied to the reactor 0.4 p.p.m. hydrogen builds up in water entering the reactor and 3.5–6 p.p.m. hydrogen builds up in steam leaving the reactor. These tests were carried out over a range of 6.5 to 12% steam content. With ammonia initially present (at the bottom of the 2.5–10 p.p.m. range) and 3.5% steam content there was 0.6 p.p.m. hydrogen and 2.5 p.p.m. ammonia in water entering the reactor and 15 p.p.m. hydrogen and 2.5 p.p.m. ammonia in water entering the reactor and 15 p.p.m. hydrogen and 7.0 p.p.m. ammonia in steam leaving the reactor.

The heat exchanger 22 provides a heated working fluid suitable for low temperature turbine or engine systems (examples of such fluids are contained in The Chemical Engineer: November 1966, page No. CE 298).

The invention may involve a slight loss of thermodynamic efficiency when compared with vacuum condensing systems but in the environment of a direct cycle B.W.R. system this loss is offset by other advantages.

(a) In the first place there is no in-leakage of air into the cycle and hence no need for removal equipment for air and radiolysis products, thus there is no gas disposal problem arising from gas separation and hence no nitrogen 16 and fission product gas disposal problem. This helps with reactor siting.

(b) If alkaline conditions are desired these can be obtained in a B.W.R. with essentially zero ammonia consumption and saving on equipment to monitor and control the ammonia.

(c) The reducing atmosphere generated within the reactor controls zirconium alloy corrosion.

In an alternative arrangement hydrogen could be deliberately added to sustain the chemically reducing atmosphere.

I claim:
1. A method of operating a direct cycle boiling water reactor in a cycle containing a turbine, including establishing a chemically reducing atmosphere of hydrogen in the core of the reactor to suppress radiolysis, said method comprising:
  (a) generating steam in the core of the reactor,
  (b) passing said steam directly to said turbine without the intervention of a heat exchanger between said core and said turbine,
  (c) condensing at above atmospheric pressure steam exhausted from said turbine,
  (d) utilizing heat removed from the steam on condensation, and
  (e) recycling said steam condensed at above atmospheric pressure, including all initial gaseous products of radiolysis, to the core without venting said gaseous products of radiolysis and thus establishing said chemically reducing atmosphere in the core of the reactor by the subsequent build-up of hydrogen to suppress further radiolysis.

(References on following page)

References Cited

UNITED STATES PATENTS

| | | | |
|---|---|---|---|
| 2,920,025 | 1/1960 | Anderson | 176—92 |
| 2,937,981 | 5/1960 | Allen et al. | 176—38 |
| 3,036,965 | 5/1962 | Braun | 176—56 |
| 3,201,319 | 8/1965 | Hackney et al. | 176—54 |
| 3,294,644 | 12/1966 | Walton | 176—38 |

OTHER REFERENCES

Third International Conf. on the Peaceful Uses of Atomic Energy, 1964, vol. 9, pp. 408–416, by Hammar et al.

Second International Conf. on the Peaceful Uses of Atomic Energy, 1958, vol. 7, pp. 436–444, by Whitham et al.

Third International Conf. on the Peaceful Uses of Atomic Energy, 1964, vol. 8, pp. 600–606, by Videm.

BENJAMIN R. PADGETT, Primary Examiner

H. E. BEHREND, Assistant Examiner

U.S. Cl. X.R.

176—38, 92